United States Patent

McNeilly et al.

[15] 3,652,798

[45] Mar. 28, 1972

[54] TELECOMMUNICATION SYSTEM

[72] Inventors: Joseph Hood McNeilly, Harlow; Ryszard Kitajewski, Nazeing, both of England

[73] Assignee: International Standard Electric Corporation, New York, N.Y.

[22] Filed: June 8, 1970

[21] Appl. No.: 44,396

[30] Foreign Application Priority Data

July 28, 1969 Great Britain ....................37,764/69

[52] U.S. Cl. ....................179/15 AL

[51] Int. Cl. ....................H04j 3/00

[58] Field of Search ....................179/15 AL, 175.31

[56] References Cited

UNITED STATES PATENTS

| | | | |
|---|---|---|---|
| 3,519,935 | 7/1970 | Hochgraf | 179/15 AL |
| 3,519,750 | 7/1970 | Bergsin et al. | 179/15 AL |
| 3,458,661 | 6/1969 | Forde et al. | 179/15 AL |

*Primary Examiner*—Kathleen H. Claffy
*Assistant Examiner*—David L. Stewart
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A timing station provides time division multiplex channel signals on a first closed loop unidirectional transmission line interconnective in tandem subscriber stations, each of which may gain access to an unused channel signal for communication with an idle subscriber station. To protect against failure of the entire system due to a break in the line or failure in one of the subscriber stations, a second closed loop unidirectional transmission line is connected to all stations transmitting signals in a direction opposite to that on the first line. Each subscriber station can detect an error and transfer the communication signals on the first line to the second line. The subscriber station before the break transfers the communication signal to the second line and the subscriber station after the break transfers the communication signals back to the first line to form a new, but continuous closed loop. When communication signals are on the second line and a fault occurs, the transfer of communication signals will be similarly performed to provide still another new, but continuous closed loop by passing the fault. Two embodiments to detect a fault and control the transfer of communication between the two lines are disclosed.

9 Claims, 11 Drawing Figures

*Inventors*
*JOSEPH H. McNEILLY*
*RYSZARD KITAJEWSKI*
By Alfred C. Hill
*Agent*

Inventors
JOSEPH H. McNEILLY
RYSZARD KITAJEWSKI
By Alfred C. Hill
Agent

Inventors
JOSEPH H. McNEILLY
RYSZARD KITAJEWSKI
By Alfred C. Hill
Agent

Inventors
JOSEPH H. McNEILLY
RYSZARD KITAJEWSKI
By Alfred C. Hill
Agent

Inventors
JOSEPH H. McNEILLY
RYSZARD KITAJEWSKI
By Alfred C. Hill
Agent

Inventors
JOSEPH H. McNEILLY
RYSZARD KITAJEWSKI
By Alfred C. Hill
Agent

Inventors
JOSEPH H. McNEILLY
RYSZARD KITAJEWSKI
By Alfred C. Hill
Agent

Inventors
JOSEPH H. McNEILLY
RYSZARD KITAJEWSKI
By Alfred C. Hill
Agent

Inventors
JOSEPH H. McNEILLY
RYSZARD KITAJEWSKI
By Alfred C. Hill
Agent

TELECOMMUNICATION SYSTEM

BACKGROUND OF THE INVENTION

This invention related to telecommunication systems, such as PCM (pulse code modulation) telephone networks, in which a group of subscribers have access to a common "ring main" loop line arranged for the continuous unidirectional circulation of time division multiplexed PCM signals.

Subscribers on the loop communicate with one another by seizing a free time slot in the loop by means of a line connecting means which connects the subscriber to the loop at the appropriate times. Signals from a first subscriber destined for a second subscriber are transmitted around the loop as far as the second subscriber and there terminated, while signals from the second subscriber for the first subscriber are transmitted around the remainder of the loop as far as the first subscriber and there terminated. If a subscriber is engaged in a call all other signals are merely regenerated and retimed and passed on to the next subscriber. The system makes use of subscriber equipment which incorporate individual pulse modulating and demodulating means, i.e., each subset includes a PCM coder and decoder. The advent of integrated solid state circuits enables such coder/decoders to be built into conventional sized telephone sets alongside other digital equipment, such as synchronizing, dialing and other circuits which can also be constructed in integrated circuits. This type of telecommunication system is fully described in the U.S. copending application of D.L. Thomas, Ser. No. 763,874, filed Sept. 30, 1968 having the same assignee as the present patent application.

A disadvantage of the system as outlined above is that if there is a break of fault in the system, i.e., a break in the ring main loop, then, since all signals have to pass round the loop, the system as a whole fails.

SUMMARY OF THE INVENTION

An object of the present invention is to provide a telecommunication system of the type described above which overcomes the above-mentioned disadvantage of such systems.

Another object of the present invention is to provide an arrangement for a telecommunication system of the type described above to protect such a system against a failure in the loop thereof.

A feature of this invention is the provision of a telecommunication system comprising a first closed loop unidirectional transmission line for transmitting signals in one direction; a second closed loop unidirectional transmission line for transmitting signals in a direction opposite to the one direction; first means coupled to the first and second lines for providing on one of the first and second lines a plurality of time division multiplexed communication channel signals; and a plurality of subscriber stations coupled to the first and second lines, each of the stations including second means to connect that one of the stations to the one of the first and second lines to establish communication on an unused one of the channel signals with an idle one of the stations, third means for detecting a first fault in the one of the first and second lines, and fourth means coupled to the third means responsive to a detected first fault to interconnect the first and second lines and transferring the channel signals on the one of the first and second lines to the other of the first and second lines, thereby cooperating to provide a first new closed loop unidirectional transmission line to bypass the fault.

According to the present invention there is provided a telecommunication system including a plurality of subscriber stations, a first closed loop unidirectional transmission line to which each subscriber may be connected, means for providing on the looped line a number of time multiplexed communication channels, each subscriber having synchronizing means whereby that subscriber may be connected to any unused channel to make a connection to another subscriber not already engaged in an existing connection, a second unidirectional transmission line parallel to the first line to which each of the subscribers and the channel providing means may be connected, each subscriber station having means for detecting a fault condition in the first line and means for terminating each line and transferring the signals from one line to the other line in the event of a fault being detected, the transferred signals being propagated in opposite directions round the two lines, means for generating an alarm signal indicating a fault condition, and means responsive to such an alarm signal to inhibit the terminating of the two lines in all subscriber stations except those initially detecting a fault condition.

Thus, if a fault occurs in the first loop, which is the one normally in use, at the station immediately preceding the fault the signals are transferred to the second loop and sent all the way back to the station immediately following the fault, where the signals are transferred back to the first loop. In other words, if the first loop is broken, a new loop approximately twice the length of first loop is created which still connects all the subscriber stations except the faulty one. If two or more faults occur, then that section of the system, between two faults, which contains the timing station remains in operation as a shortened double length loop.

The present invention is concerned only with avoiding faults which occur in the loop lines or the subscriber stations. For the purposes of this specification, it will be assumed that the timing station is operating correctly.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENTS

Figure 1:
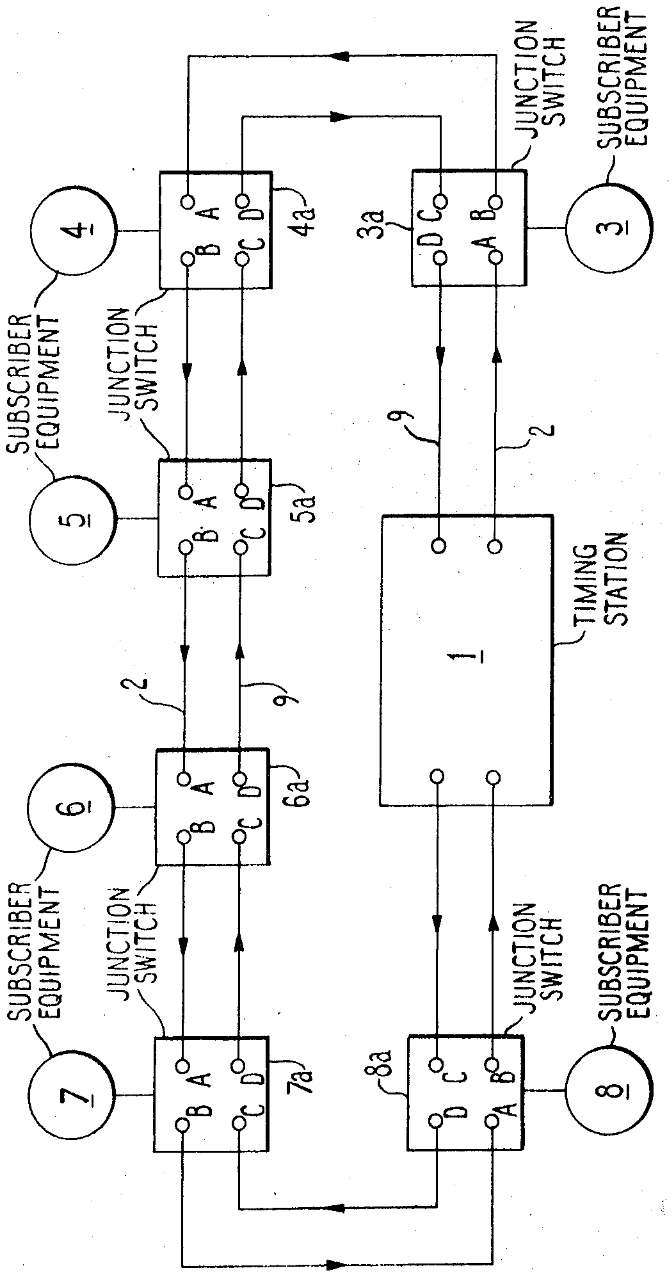
FIG. 1 is a block diagram of the basic structure of a PCM ring-main telephone system with two looped transmission lines in accordance with the principles of the present invention.

In the system shown in FIG. 1, the timing station 1 generates a synchronizing signal in one channel of a time division multiplex multichannel frame and empty-channel signals in all the other channels. These signals are transmitted unidirectionally around the closed loop unidirectional transmission line 2, hereinafter referred to as the "primary line." Each of the subscriber stations include subscriber equipment 3–8 and junction switches 3*a*–8*a*. Equipment 3–8 has access to line 2 and to the TDM channel signals thereon via its associated one of junction switches 3*a*–8*a*. All the primary line signals are fed into each subscriber station. A call from one subscriber to another is effected by the calling station identifying and locking on to an empty channel. The empty channel signal is replaced by a signal identifying the called subscriber. The latter recognizes its own unique signal on a hitherto empty channel and locks onto that channel. The called station modifies the identity signal to indicate that it is ready to proceed with a call — this modified signal travels round the remainder of the primary line loop to the calling station which is then able to put PCM speech signals into the channel. If the called station is already engaged, the unmodified identity signal is allowed to proceed past the called station and when it is received back at the calling station the latter recognizes it as a busy signal.

It will be appreciated, therefore, that, in the absence of any special fault-avoidance arrangements, any fault which breaks the primary line would disable the entire system.

According to the present invention the system includes a secondary line 9 running parallel to the primary line. Signals on the secondary line travel in the opposite direction to those on the primary line. Under normal operating conditions, the secondary line carries a unique standby signal generated at timing station 1. Each subscriber station junction switch has facilities for distinguishing between the presence and absence of signals on either line. The system also includes facilities for generating alarm signals and each junction switch has means for detecting the presence of alarm signals generated by other junction switches.

The system to be described can deal with the following faults:

a. Both primary and secondary lines open circuit or short circuit;

b. Primary line open circuit or short circuit;

c. Secondary line open circuit or short circuit; and d. Two or more of the above faults occurring simultaneously.

Consider the operation of the junction switches shown in FIG. 1. During normal operation each junction switch completes the primary line by virtue of a connection from A to B. The secondary line is completed at each switch by a connection from C to D.

Figure 2:
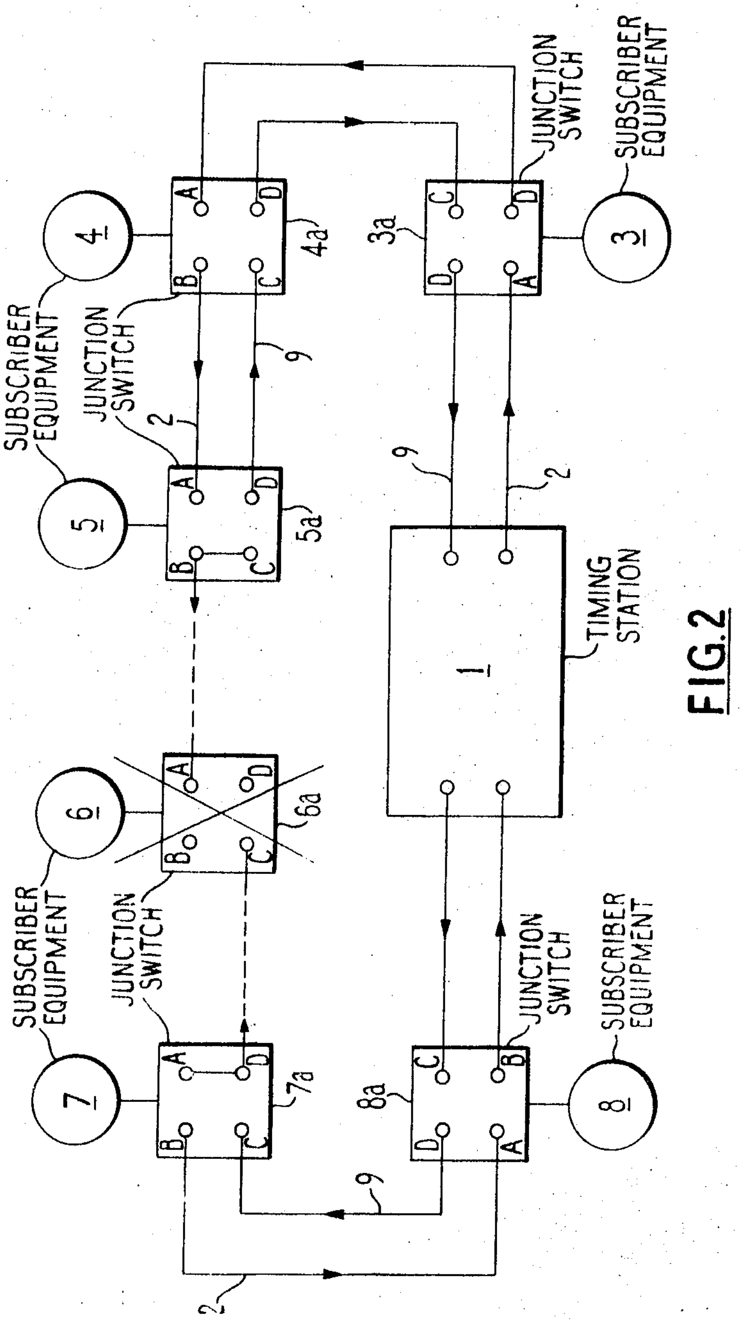
FIG. 2 is a block diagram of the system of FIG. 1 when a fault occurs in a subscriber station.

Consider now the fault situation illustrated in FIG. 2, where a fault occurs in subscriber station 6 such that the system as a whole fails. Junction switch 7*a* detects the absence of signals on the primary line and diverts the output from D, which would have otherwise gone to 6*a*, to terminal A in 7*a*. At the same time it sends an alarm signal out over the primary line to junction switch 8*a*. Junction switch 8*a* detects initially the absence of signal on the primary line and operates to break the two lines and connect A to D as in the case of junction switch 7*a*. However, it is still able to receive the alarm signal from 7*a* and when this is received the A to D connection is broken and the switch reverts to normal operation. This procedure is repeated until the alarm signal reaches junction 5*a*, where it is transferred to the secondary line and so eventually reaches timing station 1 for the second time, having once passed through timing station 1 on the primary line. The timing station then removes from its outgoing secondary line 9 the unique standby signal and connects the outgoing line directly to a bypass connection in the timing station.

Timing station 1, therefore, incorporates three extra circuits for the purposes of the present invention, a standby signal generator, a primary line signal detector and a bypass switch.

Thus, after only a brief pause, all the subscriber stations except station 6 are again connected by a new unbroken closed loop line running through junction switches 3*a*, 4*a* and 5*a* on the primary line, returning through 4*a*, 3*a*, timing station 1, 8*a* and 7*a* on the secondary line and, thus, finally back to timing station 1 through 7*a* on the primary line.

Should a fault occur in one of the lines between two subscriber stations the same procedure occurs with respect to the station which detects the fault. Thus, if the primary line is broken or short circuited between stations 5 and 6, the transfer and alarm procedure is initiated by junction switch 6*a*. At the same time, secondary line 9 is interrupted by the transfer switching operation in junction switch 6*a* and junction switch 5*a* detects the loss of standby signal in secondary line 9 and initiates a transfer procedure as before. Again the system is restored to full operation — this time without the loss of a subscriber station.

If the fault between stations 5 and 6 was in the secondary line similar procedures would be followed, except that in this case junction switch 5*a* would be the first to respond.

If two or more faults occur simultaneously, the subscribers on either side of timing station 1, between timing station 1 and the nearest fault, will be provided with restricted service, but the subscribers between the faults will lose their service.

Figure 3:
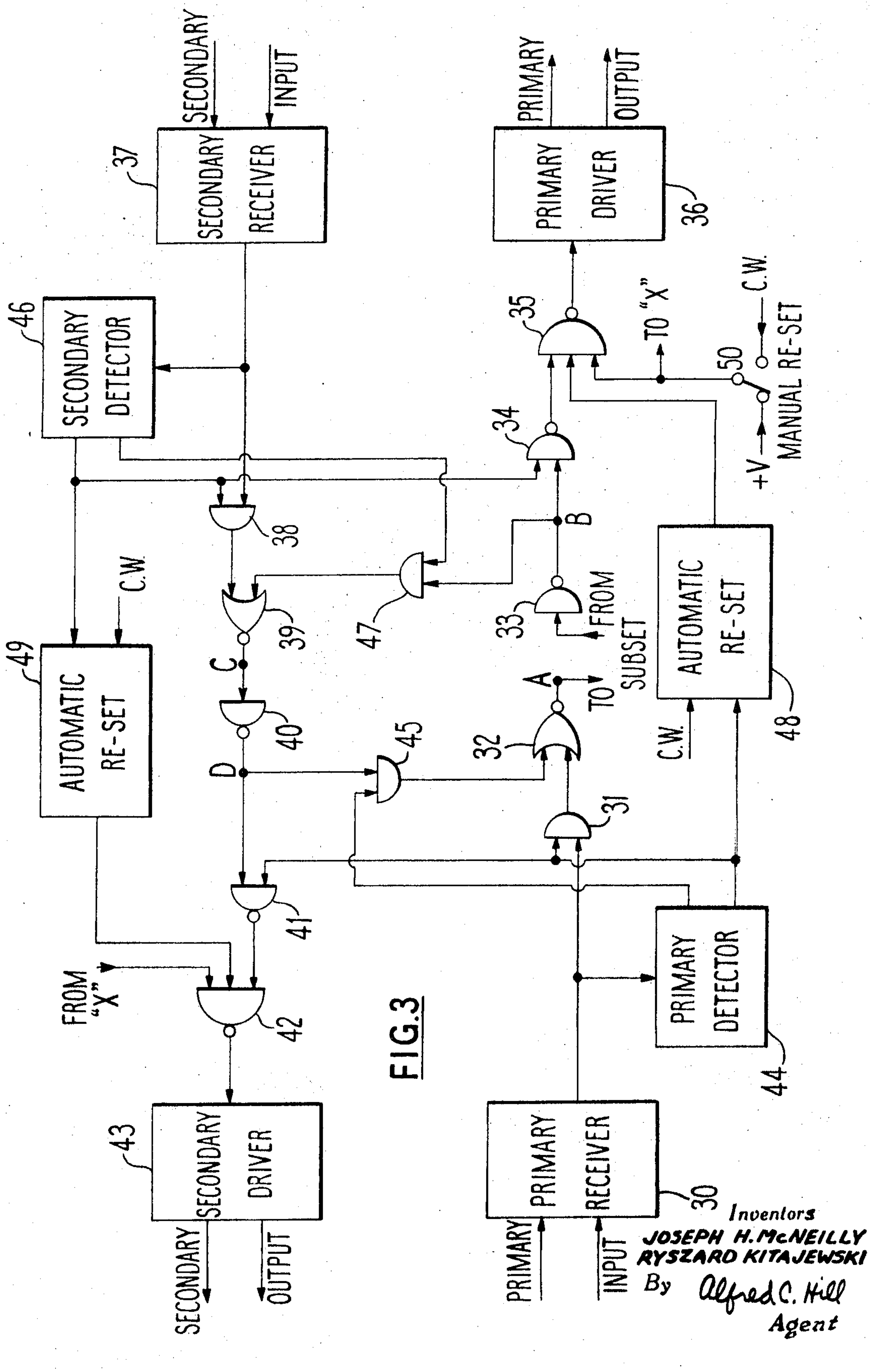
FIG. 3 is a block diagram of part of a subscriber station in the system of FIGS. 1 and 2.

The main parts of a subscriber station junction switch relating to the present invention are illustrated in FIG. 3. The points A, B, C, D correspond to A, B, C, D in FIGS. 1 and 2.

In normal operation, the primary line input is connected to the primary line output via the primary line receiver 30, gates 31, 32, the speech and dialling portion of the subset, gates 33, 34 and 35, and the primary line driver 36. Similarly, the secondary line is completed through receiver 37, gates 38, 39, 40, 41, 42 and driver 43.

When a faulty condition occurs so that there is a loss of signal on the primary line input, this is detected by primary line detector 44. As a result of this gate 31 is disabled, gate 41 is disabled and gate 45 is enabled. The junction switch is, thus, isolated from the primary and secondary lines on the fault side of the switch and the signals appearing at D on the secondary line are transferred to A on the primary line via gate 45.

Should the fault be on the secondary line, secondary line detector 46 operates in exactly the same manner the signals at point B are transferred via gate 47 to point A.

Figure 4:
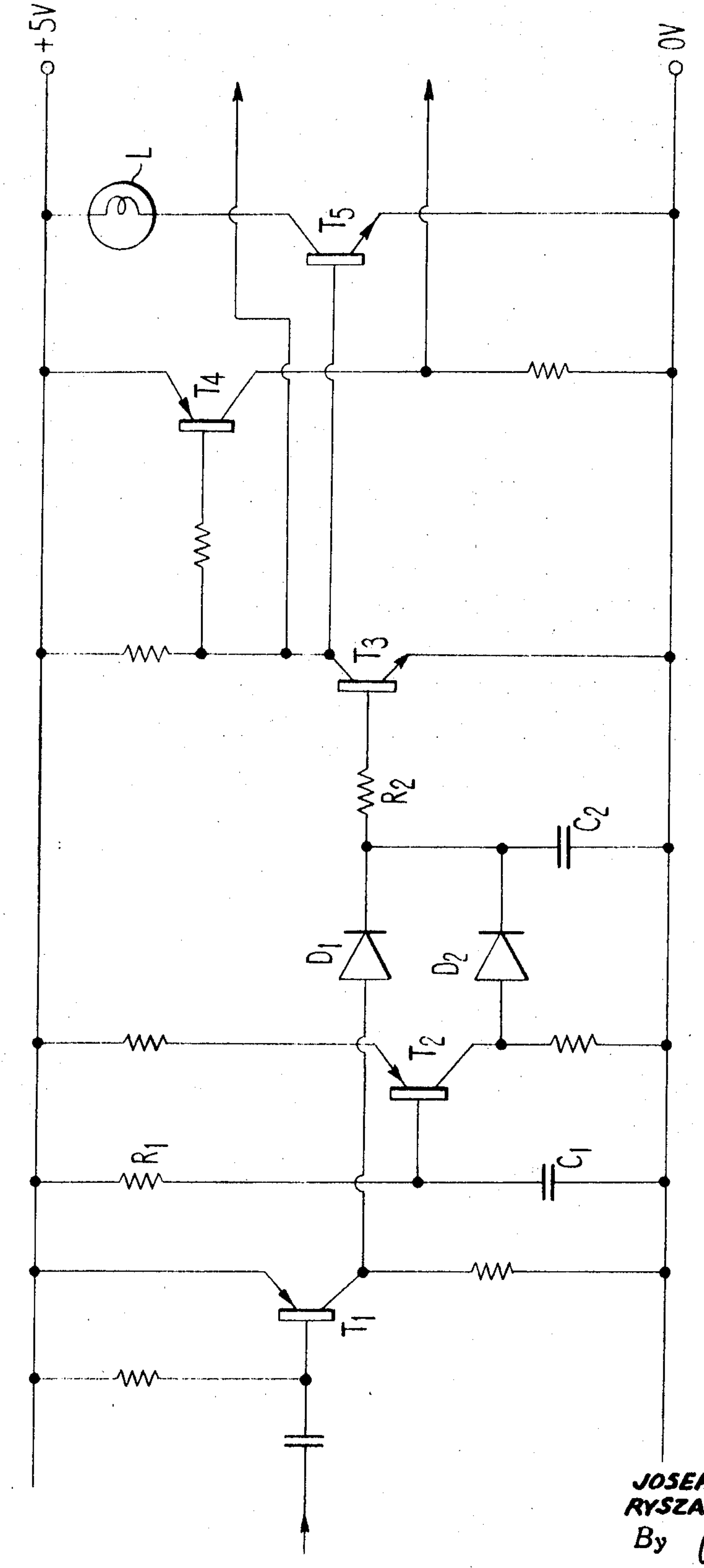
FIG. 4 is a schematic diagram of the line fault detector used in the subscriber station of FIG. 3.

The function of line detectors 44 and 46 is to detect the absence of a line signal. This is achieved in the circuit shown in FIG. 4. A return-to-zero, 50 percent duty cycle, line signal is used. The line signal, after amplification and inversion in transistor $T_1$ is passed on through diode $D_1$ to be integrated and stored on capacitor $C_2$. Provided that the potential across capacitor $C_2$ is greater than $V_{BE}$ (base to emitter voltage) of transistor $T_3$, transistors $T_3$ and $T_4$ will conduct with their collectors approximately at 0 and + 5 volts, respectively. These are the potentials required for the junction switch to pass the line signal through. When line signal disappears, capacitor $C_2$ loses its charge through resistor $R_2$ and base-to-emitter resistance $R_{BE}$ of transistor $T_3$ (neglecting other factors) until the potential across capacitor $C_2$ drops below the $V_{BE}$ junction potential of transistor $T_3$. Transistors $T_3$ and $T_4$ will then be nonconductive with the collectors approximately at + 5 volts and 0 volts, respectively. The potentials from the line detectors are now reversed causing the junction switch to divert the line signal from one closed loop line onto the other closed loop line in response to a fault.

Resistor $R_1$, capacitor $C_1$, transistor $T_2$ and diode $D_2$ form a circuit that prevents the system from locking itself into the shortest loop at the instant of switching on the power supply, i.e., at the instant of switching the power supply on capacitor $C_1$ presents a short circuit to base collector junction of transistor $T_2$, making transistor $T_2$ conductive, thus, causing capacitor $C_2$ to be charged through $D_2$. The potential across capacitor $C_1$ rises with a time constant $C_1$ $R_1$ towards the supply voltage. When the potential across resistor $R_1$ falls below the potential of the base-emitter junction of transistor $T_2$, transistor $T_2$ stops conducting, and the charge on capacitor $C_2$ leaks away in a normal way through $R_2$ and the base-emitter resistance of transistor $T_3$. The time constant $C_2$ $R_2$ $T_3$ ($R_{BE}$) is sufficiently long ($\approx$100 $\mu$sec.) to keep the junction switches conductive until both primary and secondary lines complete the longest new closed loop ring.

Transistor $T_5$ is used to monitor the presence of a line signal on the ring. Normally, transistor $T_5$ is non-conductive with the monitor (lamp L) off. When the line signal disappears, transistor $T_5$ conducts, bringing the monitor on, thus, indicating a fault.

Figure 5:
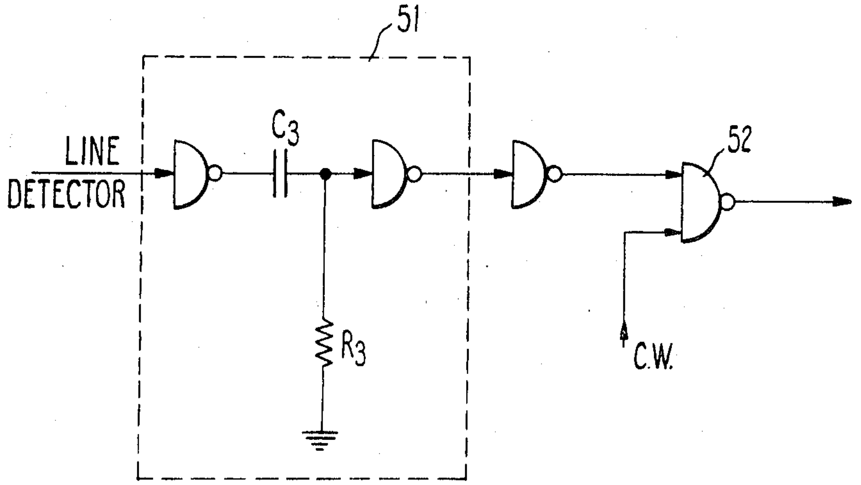
FIG. 5 is a schematic diagram of the automatic reset logic used in the subscriber station of FIG. 3.

When a fault occurs each junction switch in turn would detect the absence of signal. The system would, therefore, tend to lock itself onto the shortest loop around the timing station. To prevent this happening an automatic reset (48, 49 FIG. 3) is included. This comprises a monostable 51 and an output gate 52 (FIG. 5). The input to the automatic reset is derived from the line detector. When a signal disappears, the outputs of a line detector change state causing the monostable to produce an output pulse. The pulse width is determined by the time constant of capacitor $C_3$ and resistor $R_3$ in FIG. 5, e.g. approximately 100$\mu$sec. For the duration of this pulse, a simulated line signal (C.W.) will be sent to the proceeding junction switch commanding it to hold the junction switch ready to receive the true line signal. As explained previously, all the junction switches to the left and to the right of the fault will receive the automatic alarm signal, except the two nearest the fault. These two will remain in the new state, i.e., transferring the signal from one line to the other. Thus, due to automatic reset the longest loop round the ring has been established. In the case of multiple faults, the subscribers on each side of timing station 1, between station 1 and the faults will form a new loop, those between the faults will lose service.

The junction switch shown in FIG. 3 also includes manual reset arrangements to bring the faulty section into the circuit after it has been repaired or replaced. A push button 50 is depressed and substitutes a C.W. signal for the DC supply to gate 35 and, via the connection X — X, to gate 42. The appearance of this C.W. signal on the primary and secondary lines at the adjacent junction switches is detected by the appropriate line detectors and makes them conducting, ready to receive the line signals. When the push button is released the line signals keep the line detectors in the conducting condition, the transfer connections are broken and the line signals are re-routed through the re-connected section.

Figure 6:
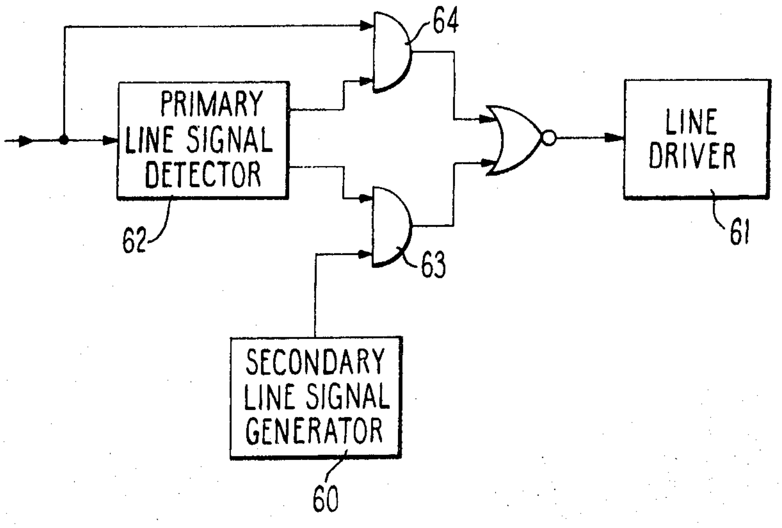
FIG. 6 is a block diagram of additional circuitry used in the timing station of FIGS. 1 and 2.

FIG. 6 shows the additional circuitry required in timing station 1, said copending application disclosing the remaining equipment of station 1. The secondary line signal generator 60 is used to generate the unique or standby signal applied to the secondary line driver circuit 61. When a fault occurs this signal is replaced at some point in the system by the re-routed primary line signals. The primary line signal detector 62 detects the loss of the standby signal and disconnects the signal generator 60 from the driver circuit 61 by closing gate 63.

At the same time it completes the loop by energizing gate 64 creating a direct link between the secondary line input and output.

Figure 7:
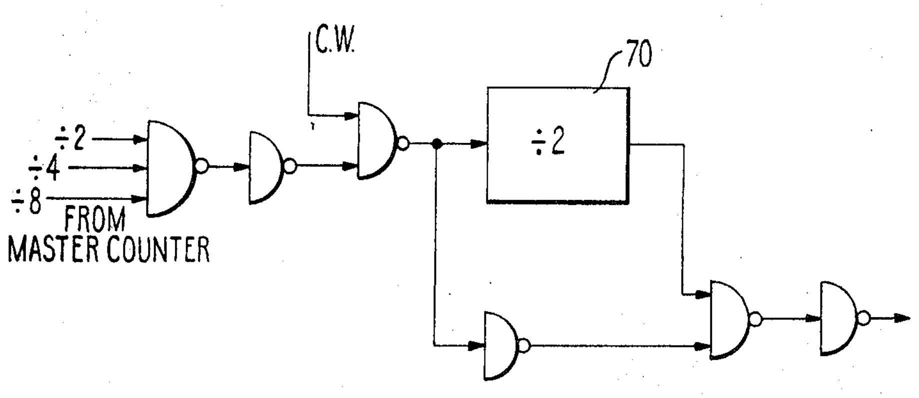
FIG. 7 is a block diagram of a secondary line signal generator used in the timing station circuitry of FIG. 6.

The secondary line signal generator is shown in more detail in FIG. 7. Basically a train of pulses (i.e., the empty channel pulses) from the timing station master counter is gated with the C.W. signal and divided by two in the divider circuit 70. The divider output is gated with the input and the resultant pulse train is applied to the secondary line driver circuit. This signal has a pulse repetition rate half that of the primary line signals.

Figure 8:
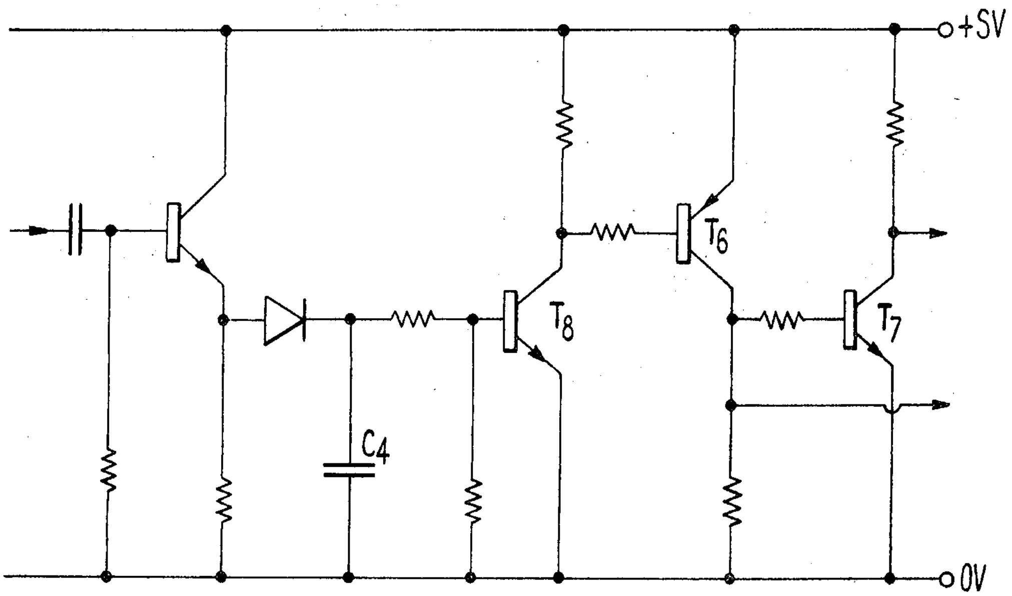
FIG. 8 is a schematic diagram of a primary line signal detector used in the timing station circuitry of FIG. 6.

The primary line signal detector 62 is shown in detail in FIG. 8. The function of the detector is to distinguish between the primary and secondary line signals on the secondary line input to the timing station. Normally, when a secondary signal is being received, the transistors $T_6$ and $T_7$ are nonconductive, keeping their collectors at 0 and +5 volts, respectively. Now, if a primary line signal appears on the secondary ring or line, and because its p.r.f. is at least twice the secondary line signal, the charge in $C_4$ increases sufficiently to bring transistor $T_8$ into conduction, causing transistors $T_6$ and $T_7$ to conduct, thus, changing their collector potential to + 5.0 and 0 volts respectively. This change of state in transistors $T_6$ and $T_7$ collectors activates a changeover switch in timing station 1. Thus, the transmission of the secondary line signal ceases, and the primary signal will be transmitted instead. Now the primary signal leaves timing station 1 on the secondary line and returns to the timing station on the primary line, thus, completing the second half of the new loop.

Figure 9:
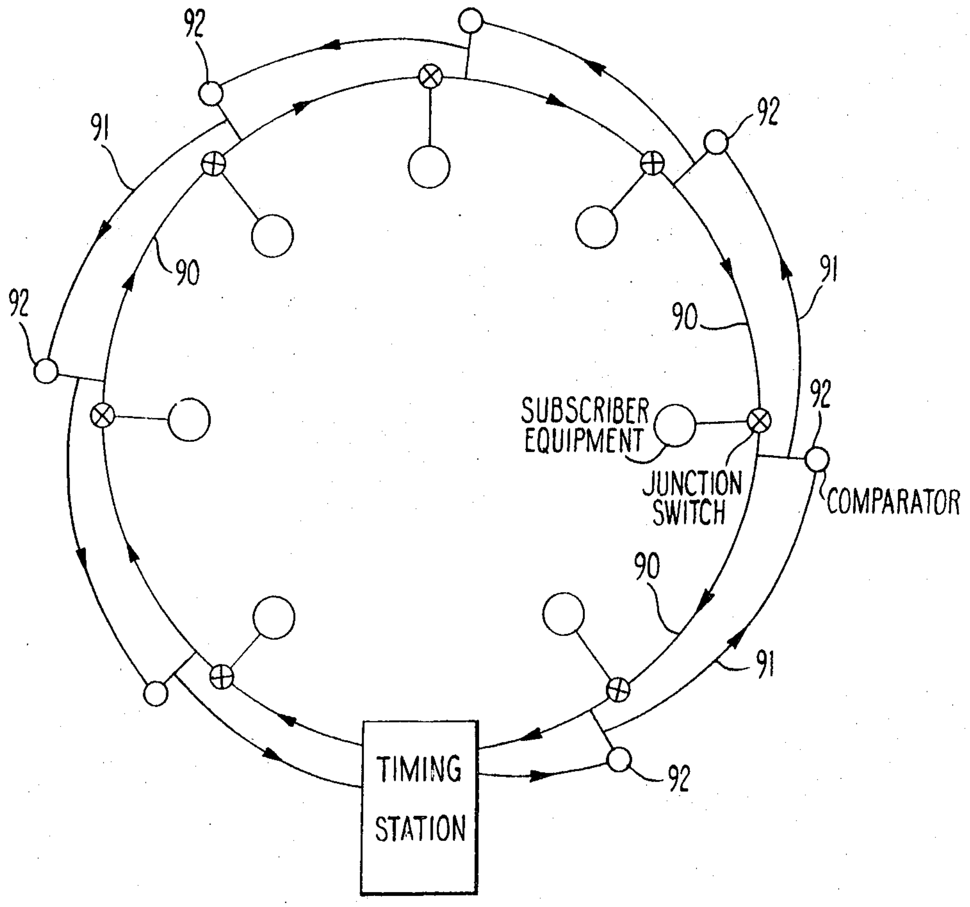
FIG. 9 is a block diagram of another embodiment of the basic system of FIG. 1.

FIG. 9 is a block diagram of another embodiment of the system of this invention. In this embodiment, the output to primary line 90 at each station is also sent back along secondary line 91 to the previous station. Each station has a comparator 92 by which it compares its own output with that of the next station along primary line 90. The degree of comparison may only be sufficient to establish that both stations are producing a digital output, or it may be precise enough to establish a high degree of correlation between the two signals.

Figure 10:
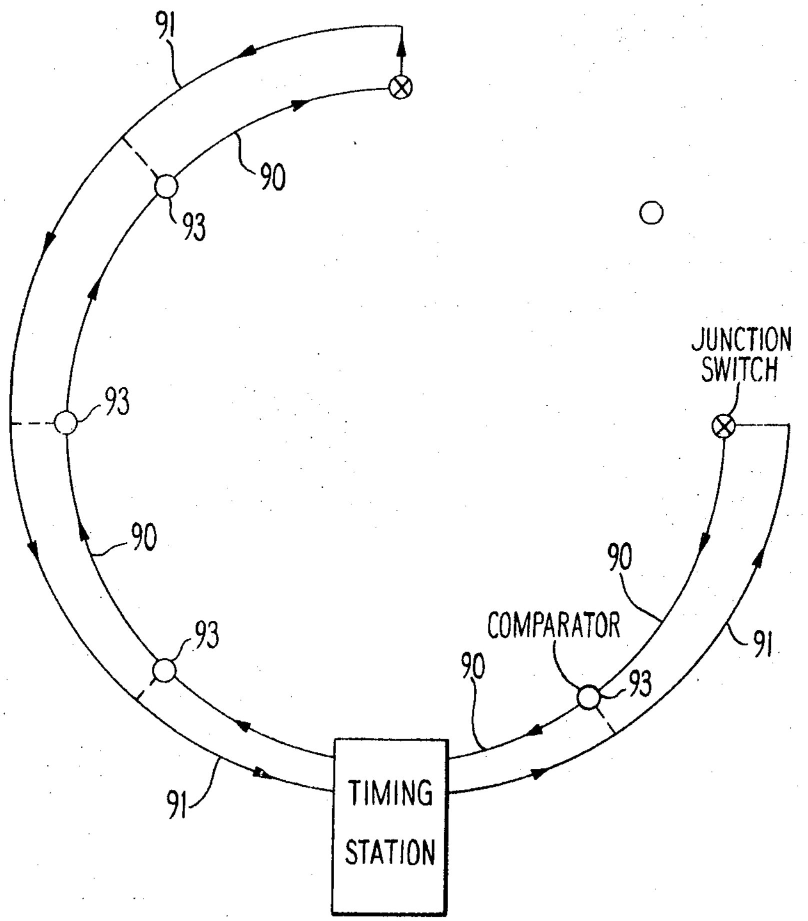
FIG. 10 is a block diagram of the system of FIG. 9 when a fault occurs in a subscriber station.

If a signal is present at the output to a station on the primary line and no signal is received back on the secondary line, then a fault condition exists at the next station, or on the line between the two. This causes the mode of operation to change as shown in FIG. 10. At the station where the fault is detected a special alarm signal is generated, preferably out-of band and carried on a separate wire (not shown), and this signal is sent back through all the stations on the line including the timing station. The station which generates the fault signal continues to send back its own output and stops transmitting it in the forward direction, but all other stations on receipt of the alarm signal no longer send back their own output, but instead retransmit the signal coming in on the secondary line. Thus, the secondary line is made continuous from the station which first detects a fault back to the timing station and beyond. After passing through the timing station, the secondary line is still carrying a signal identical to the output from the station which detected the fault, and, because of the fault, there is no signal on the primary line.

To find the best point for feeding the secondary line back onto the primary, it is necessary to introduce another set of comparators 93. The first set compared the output from a station on the primary with the input on the secondary. The second set must compare the input to the station on the primary with the output on the secondary. This second set should be able to set and reset automatically depending on the inputs. If no signal is coming in on the primary line, then the signal on the secondary is injected, however, if later on a signal does appear on the primary, then it will have priority and will be relayed through the station in the normal way.

When a break occurs there will be no signal on the primary beyond the break. Each of the second group of comparators 93 on this section of the ring will register the absence of the primary and cause the signal on the secondary to be fed onto the primary. Since the comparators are reversible, they will all switch back again except the one closest to where the break occurred, thus, providing the closed loop of FIG. 10. If, after a few frames delay, a comparator of the second set is still causing the secondary signal to be fed onto the primary, then that station will also initiate the alarm. It will then continue feeding the secondary ring back onto the primary, but will stop transmitting the secondary signal to the next station. In this way the operating alarm circuits are duplicated so that even with the failure of one alarm, the change-over in operating conditions can still be carried out. Once an alarm has been set and the signal is being sent back along the other line, then inhibiting the further forward transmission into the damaged section ensures that intermittent faults are treated as permanent breaks. A station generating the alarm signal can only be reset manually.

The first set of comparators cause the system to switch between the two modes of operation: either sending back their own output on the secondary line or, in the presence of the alarm, relaying the signal coming in on the secondary. If the alarm is removed, or if the signal on the secondary line disappears due to a second fault developing, then the comparators revert to sending back their own output and continue to do so for a number of frames. This should restore the secondary input to all but the one closest to the fault. Either the alarm signal is still present, in which case all stations, except the one registering the new fault, switch back to acting as relays on the secondary or, if the original alarm signal has been removed by the fault, they will not switch back until the station registering the new fault has begun to generate and transmit the fault alarm signal. A station can only initiate the alarm signal after having transmitted its own output for a number of frames, and not if the secondary line signal disappears while it is acting as a relay on the secondary. In this way the second fault is located and the loop reconnected to include the maximum possible number of subscribers. Only the section between the two faults is excluded from service. The same process operates for a greater number of faults.

If the second fault occurs on the timing station primary output, then for half of the system of FIG. 10 the primary line signal disappears. This is corrected as before: if no signal is coming in on the primary line then the signal on the secondary is injected. However, if later on a signal does appear on the primary then it will have priority and will be relayed through the subset in the normal way.

Figure 11:
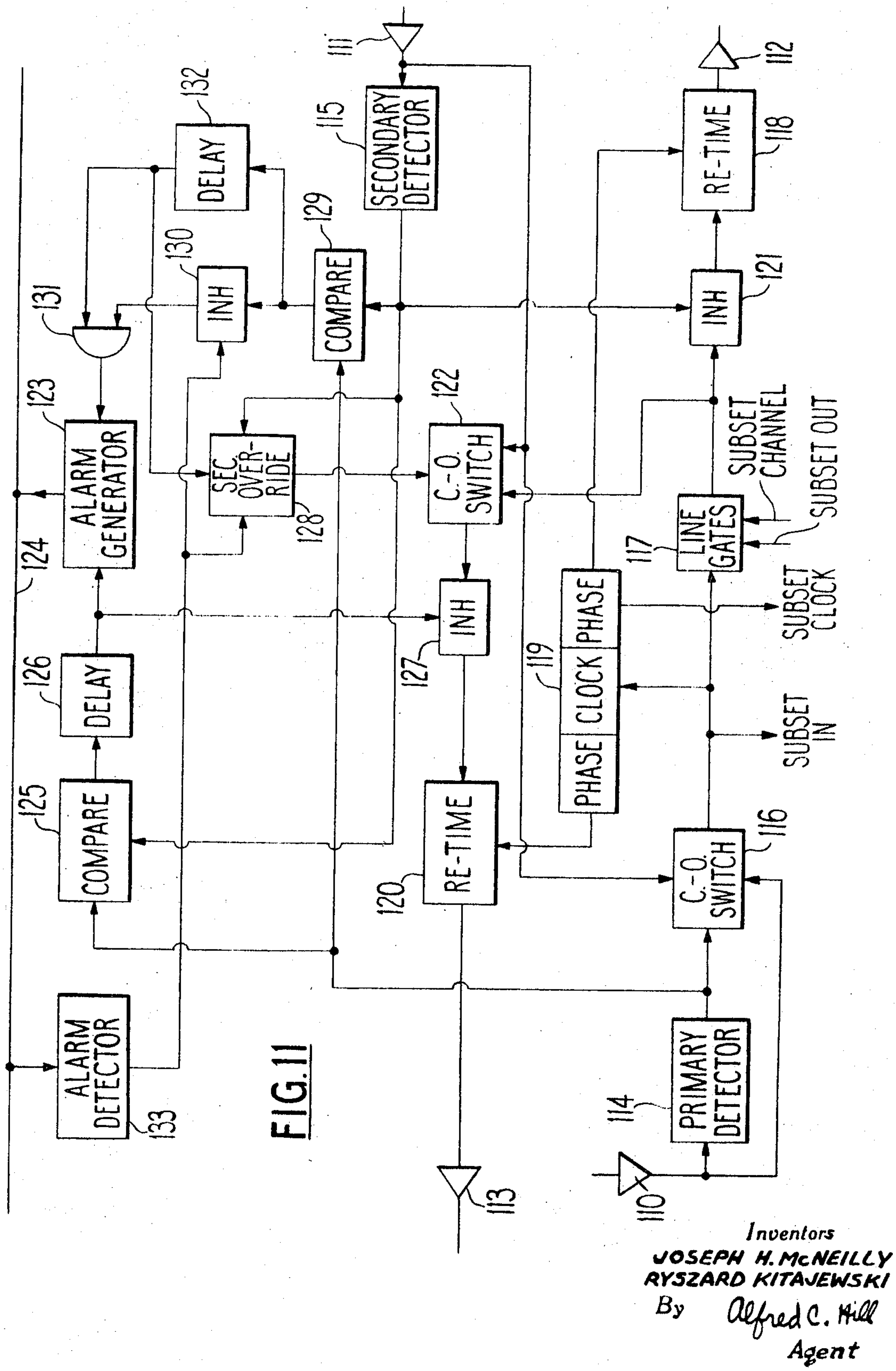
FIG. 11 is a block diagram of the circuitry of part of a subscriber station in the system of FIGS. 9 and 10.

The constructional details of a subscriber station for the system shown in FIGS. 9 and 10 will now be described with reference to FIG. 11. The primary and secondary line inputs are terminated by their respective line receivers 110, 111. The outgoing signals are fed to the lines by the primary and secondary line drivers 112, 113. The primary and secondary line detectors 114, 115 detect the presence or absence of line signals on the incoming lines.

If the primary signals are present they are allowed through the switch 116 to the subset line gates 117 and on to the retiming circuit 118 and primary line driver 112. The signals passed to the line gates 117 are used to drive the local clock circuit 119 which includes phase selectors which control the retiming circuits 118, 120. The outputs of the two detectors 114 and 115 are the signals which are used for comparison purposes as outlined above. In this context "comparison" merely means "are both signals present or is one absent?"

It must be remembered that when a fault occurs, in either the primary or the secondary, two stations will detect the fault condition, one on either side of the fault. In both cases an alarm signal is generated by the alarm circuit 123 and sent out over the alarm wire 124. Three sets of circumstances will now be considered:

a. Failure in the primary line input;
b. Failure in the secondary line input; and
c. Receipt of an alarm signal on the alarm wire.

a. A fault occurs in the primary line between the station under consideration and the preceding station, i.e., the absence of a primary signal is detected by the detector 114. In terms of FIG. 11, the station concerned is the one to the right of the fault and this station is required to transfer the incoming secondary signal to the primary line where it forms the input to the subset and is then fed to the primary line driver. Therefore, detector 114 operates change-over switch 116 and the secondary signal replaces the primary signal at this point. At the same time comparator 125 generates an output if the secondary signal is present and the primary signal is absent. This output, after being delayed for a short time, typically two or three frames, by delay 126, operates the alarm generator 123 which puts out an alarm signal to the rest of the system over the alarm wire 124. The delayed output also operates an inhibit gate 127 which cuts off the secondary line output. Thus, the incoming secondary signals are rerouted onto the outgoing primary line.

b. A fault occurs causing the absence of the secondary line signals. This may be due to a fault in the secondary line from the succeeding station to the right, or a fault in the primary line leading to the station on the right. (It has been explained in the preceding example how the secondary signals may be cut off by the operation of gate 127.)

The secondary line detector 115 operates the inhibiting gate 121 and cuts off the primary output. No change-over of signals is required at changeover switch 122 because under normal conditions it is already passing the primary signals back along the secondary line. Comparator 129 delivers an output when the secondary is absent and the primary is present, and this operates the alarm circuit via the inhibit gate 130 and the OR gate 131. Since the alarm will be picked up immediately by the stations own alarm detector 133 which, for reasons to be explained later, is the control for the inhibit gate 130, a bypass for this gate is provided via the delay circuit 132. The alarm detector also controls gate 128 the function of which is explained below.

c. When no fault is detected by the station under consideration, but a fault is detected by another station, an alarm signal is detected by the alarm detector 133. The station is required to remove the primary signal which up till now has been returned on the secondary line to the preceding station and to replace it with the secondary line input.

The receipt of an alarm signal coupled with the presence of the secondary signal, as detected by detector 115, allows the output of delay 132 to pass through gate 128 and operate the changeover switch 122. This replaces the outgoing primary signals on the secondary line with the incoming secondary signals.

Suppose now that a second fault occurs which is detected at the station under consideration. The second fault can be either a failure of the primary input, or a failure of the secondary input. If the secondary input disappears, the relevant output of detector 115 overrides the existing alarm signal at gate 128 and removes the control from changeover switch 128. This restores the primary signal to the outgoing secondary line and the operating procedures are otherwise as described in (b) above. If the primary signal fails, the output of detector 114 inhibits the input to delay 132 by operating comparator 129. This also removes the control from gate 128 and the remaining procedures are as described in (a) above.

It will be noted that once a station has responded to an alarm generated elsewhere it will not be affected by further simultaneous alarms from other stations. Any alarm will be maintained so long as a fault condition remains.

While I have described above the principles of my invention in connection with specific apparatus, it is to be clearly understood that this description is made only by way of example and not as a limitation to the scope of my invention as set forth in the objects thereof and in the accompanying claims.

We claim:

1. A telecommunication system comprising:
a first closed loop unidirectional transmission line for transmitting signals in one direction;
a second closed loop unidirectional transmission line for transmitting signals in a direction opposite to said one direction;
first means coupled to said first and second lines for providing on one of said first and second lines a plurality of time division multiplexed communication channel signals; and
a plurality of subscriber stations coupled to said first and second lines, each of said stations including
second means to connect that one of said stations to said one of said first and second lines to establish communication on an unused one of said channel signals with an idle one of said stations,
third means for detecting a first fault in said one of said first and second lines, and
fourth means coupled to said third means responsive to a detected first fault to interconnect said first and second lines and transfer said channel signals on said one of said first and second lines to the other of said first and second lines, said first and second lines thereby cooperating to provide a first new closed loop unidirectional transmission line to bypass said first fault;
each of said stations further including
fifth means coupled to said third means for generating a first alarm signal upon detection of said first fault for transmission on said one of said first and second lines; and
sixth means responsive to said first alarm signal to inhibit said interconnection of said first and second lines in all of said stations except those of said stations initially detecting said first fault.

2. A system according to claim 1, wherein
each of said stations further include
seventh means for detecting a second fault in said other of said first and second lines; and
eighth means coupled to said seventh means responsive to a detected second fault to interconnect said first and second lines and transfer said channel signals on said other of said first and second lines to said one of said first and second lines, said first and second lines thereby cooperating to provide a second new closed loop unidirectional transmission line to bypass said second fault.

3. A system according to claim 2, wherein
each of said stations further include
ninth means coupled to said seventh means for generating a second alarm signal upon detection of said second fault for transmission on said other of said first and second lines, and
tenth means responsive to said second alarm signal to inhibit said interconnection of said first and second lines in all of said stations except those of said stations initially detecting said second fault.

4. A system according to claim 3, wherein
each of said third means and seventh means includes
eleventh means for generating two different signals having a predetermined relationship in the absence of any fault,
twelfth means coupled to the associated one of said first and second lines for integrating and storing signals received from said associated one of said first and second lines,
a first source of reference signal having a given amplitude value,
thirteenth means coupled to said first source and said 12th means for comparing the amplitude value of said stored signal with said given value of said reference signal, and
fourteenth means coupled to said 13th means responsive to a predetermined change between said value of said stored signal and said given value of said reference signal to reverse said predetermined relationship of said two different signals.

5. A system according to claim 4, wherein
said first means further includes
fifteenth means coupled to said other of said first and second lines to transmit a unique signal thereover; and
each of said stations further includes
a second source of signal simulating said unique signal,
a monostable device coupled to said eleventh means responsive to one of said two different signals having a predetermined condition to produce an output pulse of predetermined width, and
gated means coupled to said second source, said monostable device and said associated one of said first and second lines responsive to said output pulse to couple said simulated unique signal to said associated one of said first and second lines for a duration equal to said predetermined width.

6. A system according to claim 5, wherein
said first means further includes
sixteenth means coupled to said other of said first and second lines for detecting thereon signals normally appearing on said one of said first and second lines and producing a control signal under this condition; and
seventeenth means coupled to said 16th means and said 15th means responsive to said control signal to inhibit the transmission of said unique signal and to connect said other of said first and second lines coming into said first means directly to said other of said first and second line leaving said first means as long as said control signal is present.

7. A telecommunication system comprising:
a first closed loop unidirectional transmission line for transmitting signals in one direction;
a second closed loop unidirectional transmission line for transmitting signals in a direction opposite to said one direction;
first means coupled to said first and second lines for providing on one of said first and second lines a plurality of time division multiplexed communication channel signals; and
a plurality of subscriber stations coupled to said first and second lines, each of said stations including
second means to connect that one of said stations to said one of said first and second lines to establish communication on an unused one of said channel signals with an idle one of said stations,
third means for detecting a first fault in said one of said first and second lines, and
fourth means coupled to said third means responsive to a detected first fault to interconnect said first and second lines and transfer said channel signals to said one of said first and second lines to the other of said first and second lines, said first and second lines thereby cooperating to provide a first new closed loop unidirectional transmission line to bypass said first fault;
each of said stations transmitting over said other of said first and second lines the signals also transmitted over said one of said first and second lines; and
each of said stations further including
fifth means coupled to said first and second lines for comparing the signals received over said one of said first and second lines from the next preceding one of said stations with the signals received over said other of said first and second lines from the next succeeding one of said stations,
sixth means coupled to said fifth means for detecting a first predetermined degree of discrepancy between the compared signals,
seventh means coupled to said sixth means for generating an alarm signal in response to the detection of said first discrepancy,
eighth means responsive to an alarm signal generated by another one of said stations to inhibit the transmission of signals over said other of said first and second lines and to connect the incoming said other of said first and second lines to the outgoing said other of said first and second lines,
ninth means coupled to said sixth means responsive to the detection of said first discrepancy to inhibit the transmission of signals over said one of said first and second lines,
tenth means coupled to said first and second lines for comparing the signals received over said one of said first and second lines with the signals received over said other of said first and second lines,
eleventh means coupled to said 10th means for detecting a second different predetermined degree of discrepancy between the signals compared in said 10th means; and
twelfth means coupled to said 11th means responsive to the detection of said second discrepancy to transfer signals received over said other of said first and second lines to said one of said first and second lines, said 12th means being inhibited when said second discrepancy is no longer detected.

8. A system according to claim 7, wherein
each of said stations further includes
thirteenth means coupled to said 11th means responsive to the detection of said second discrepancy for generating an alarm signal.

9. A system according to claim 8, wherein
each of said thirteenth means includes
fourteenth means coupled to said eleventh means for inhibiting the generation of said alarm signal for a given period of time after the detection of said second discrepancy.

* * * * *